Figure 1:
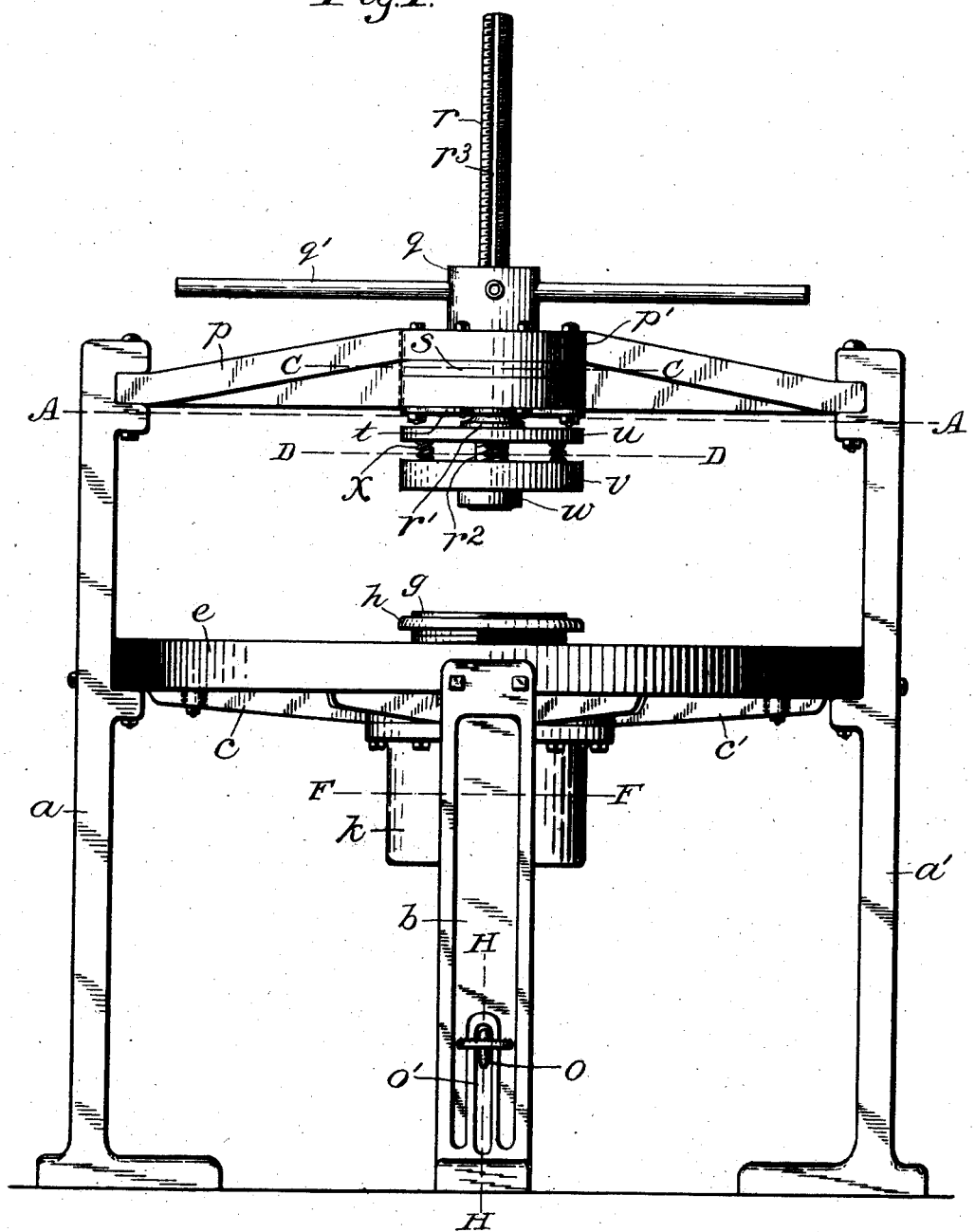

No. 882,855.　　　　　　　　　　　　　　　PATENTED MAR. 24, 1908.
J. R. WELCH.
WHEEL ASSEMBLING MACHINE.
APPLICATION FILED MAR. 27, 1907.

4 SHEETS—SHEET 1.

WITNESSES:
J. H. Gardner.
M. D. Beaty.

INVENTOR:
John R. Welch,
BY
E. T. Silvius,
ATTORNEY

No. 882,855. PATENTED MAR. 24, 1908.
J. R. WELCH.
WHEEL ASSEMBLING MACHINE.
APPLICATION FILED MAR. 27, 1907.
4 SHEETS—SHEET 2.
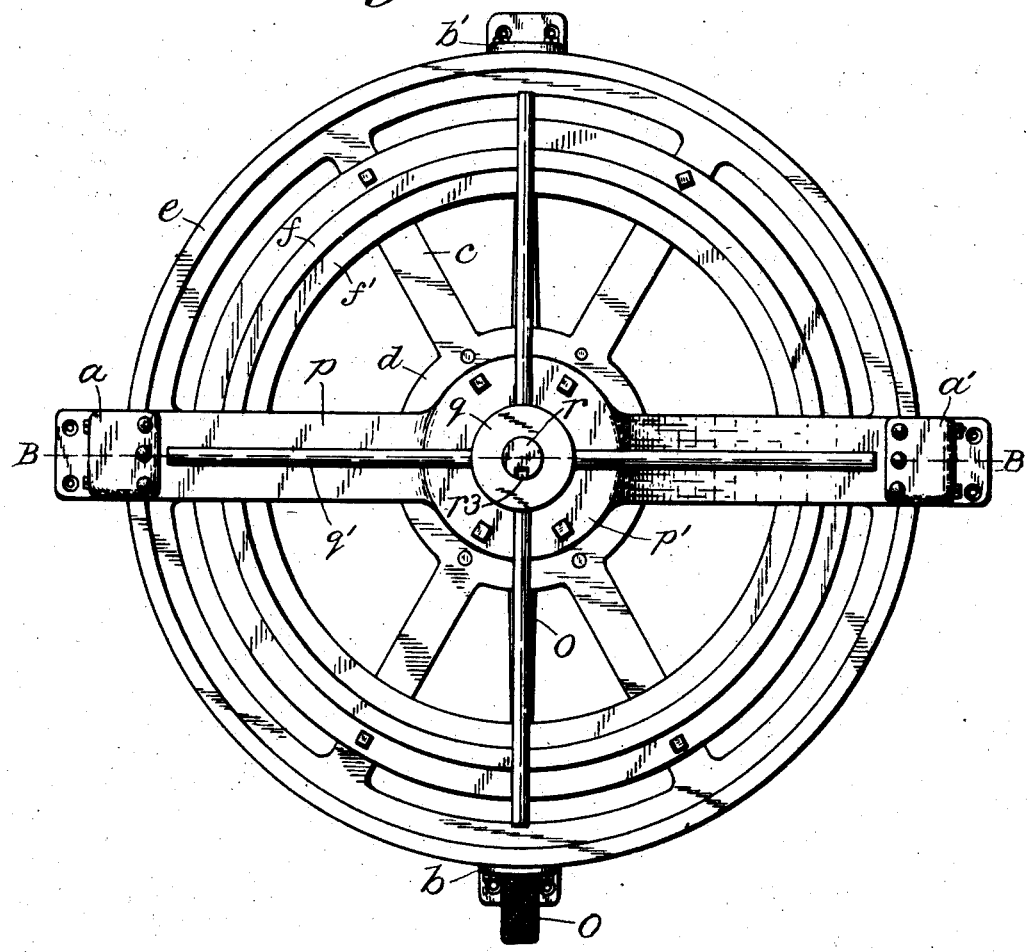
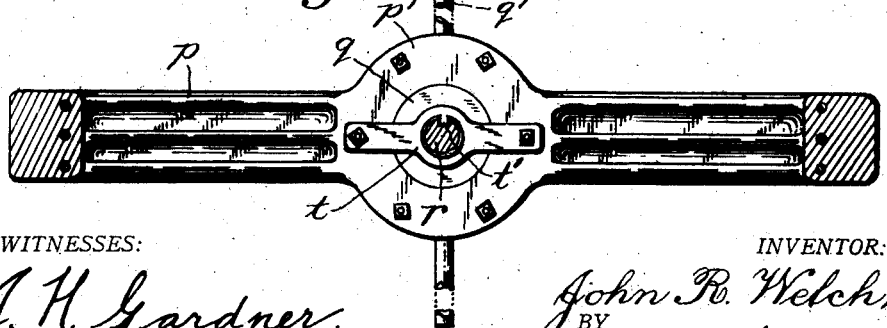
WITNESSES:
J. H. Gardner.
M. D. Beaty.
INVENTOR:
John R. Welch,
BY
E. T. Silvius,
ATTORNEY.

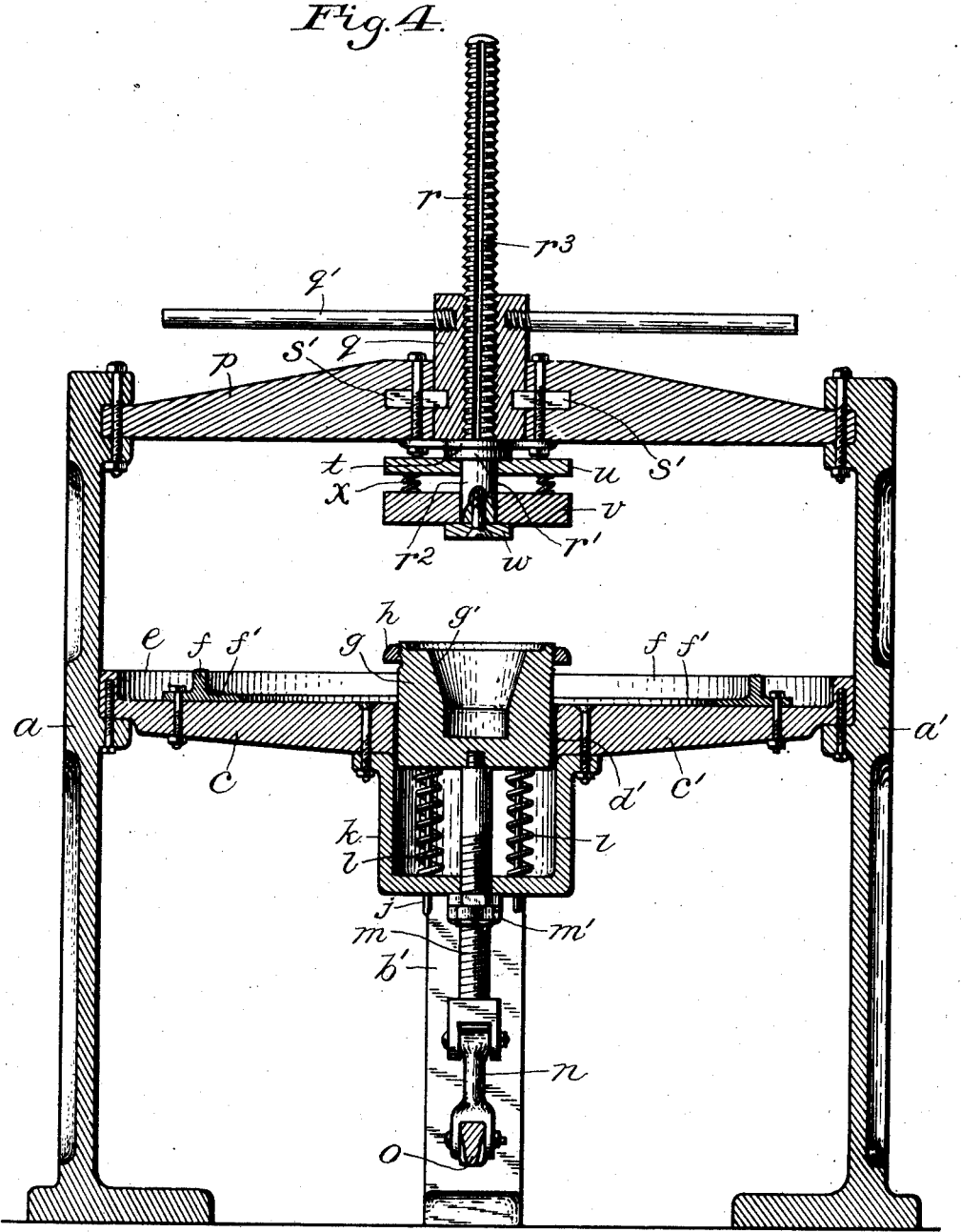

No. 882,855. PATENTED MAR. 24, 1908.
J. R. WELCH.
WHEEL ASSEMBLING MACHINE.
APPLICATION FILED MAR. 27, 1907.
4 SHEETS—SHEET 4.
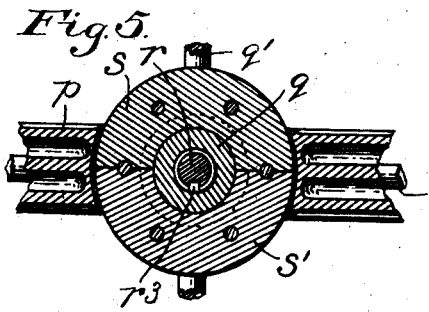
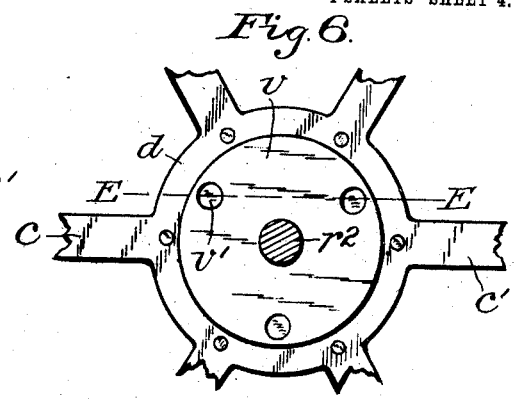
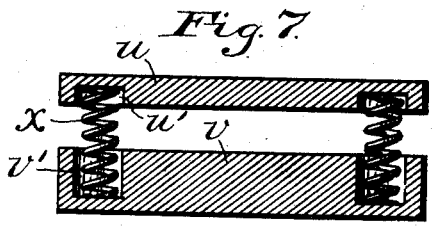
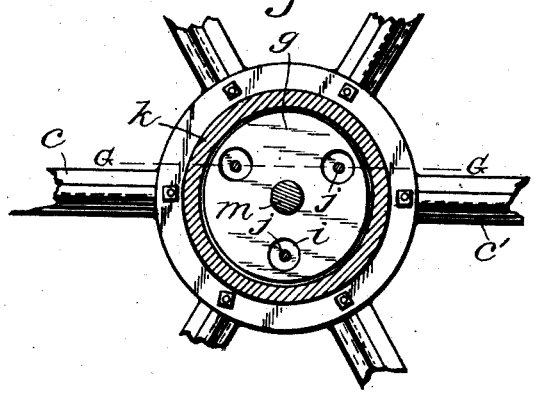
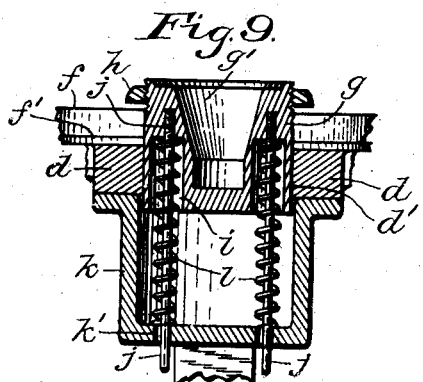
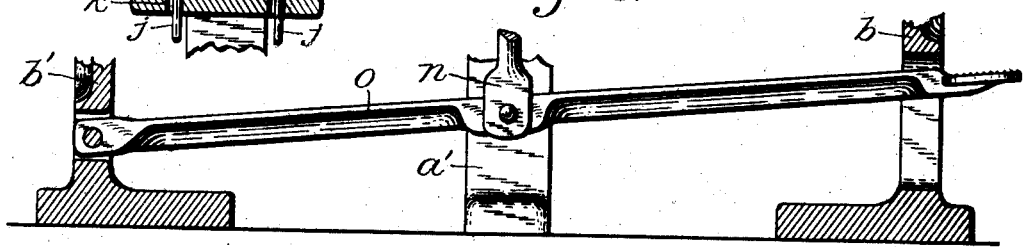
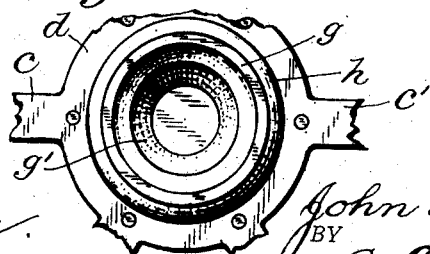
WITNESSES:
J. H. Gardner.
M. D. Beaty.
INVENTOR:
John R. Welch,
BY E. T. Silvius.
ATTORNEY.

UNITED STATES PATENT OFFICE.

JOHN R. WELCH, OF ALEXANDRIA, INDIANA, ASSIGNOR TO KEEFER-HEART IRON AND STEEL COMPANY, OF ALEXANDRIA, INDIANA, A CORPORATION OF INDIANA.

WHEEL-ASSEMBLING MACHINE.

No. 882,855.     Specification of Letters Patent.     Patented March 24, 1908.

Application filed March 27, 1907. Serial No. 364,905.

*To all whom it may concern:*

Be it known that I, JOHN R. WELCH, a citizen of the United States, residing at Alexandria, in the county of Madison and State of Indiana, have invented certain new and useful Improvements in Wheel-Assembling Machines; and I do declare the following to be a full, clear, and exact description of the invention, reference being had to the accompanying drawings, and to the letters and figures of reference marked thereon, which form a part of this specification.

This invention relates to machines whereby the different parts of vehicle wheels may be assembled and connected together, the invention having reference particularly to a machine that is designed to be used in assembling the parts of metallic wagon or carriage wheels adapted to force the spokes into the rims or fellies of the wheels.

The object of the invention is to provide a time-saving machine in which the hub, the spokes and the rim of a wheel may be quickly connected together and the spokes pressed forcibly into the rim while seated in the hub, a further object being to provide a machine whereby the work may be accurately performed and which will be durable and economical in use.

With the above-mentioned and minor objects in view, the invention consists in a wheel-assembling machine comprising a table upon which a wheel rim or felly may be gaged and supported, a socket head movable in the table to receive a part of the wheel hub and hold it above the plane of the table while entering the spokes in the rim and the hub, and a ram for forcing the spokes into the rim; and the invention consists further in the novel parts and the combinations and arrangements of parts as hereinafter particularly described and pointed out in the following claims.

Referring to the drawings Figure 1 is a front elevation of the machine constructed substantially in accordance with the invention; Fig. 2, a top plan thereof; Fig. 3, a fragmentary horizontal sectional view on the line A A in Fig. 1, inverted; Fig. 4, a vertical transverse sectional view on the line B B in Fig. 2; Fig. 5, a fragmentary horizontal sectional view on the line C C in Fig. 1 inverted; Fig. 6, a fragmentary horizontal sectional view on the line D D in Fig. 1, looking downward; Fig. 7, a vertical sectional view of parts of the ram head on the plane of the line E E in Fig. 6; Fig. 8, a fragmentary sectional view on the line F F in Fig. 1, inverted; Fig. 9, a fragmentary vertical sectional view on the plane of the line G G in Fig. 8, showing the details of the socket head and mountings thereof; Fig. 10, a fragmentary sectional view approximately on the line H H in Fig. 1; and, Fig. 11, a fragmentary top plan view of the socket head and adjacent parts of the table.

Similar reference characters in the different figures of the drawings designate corresponding elements or features of construction.

In a practical embodiment of the invention the machine comprises two posts $a$ and $a'$ and preferably two shorter posts $b$ and $b'$, but if desired the shorter posts may be dispensed with; or, a greater number of them may be provided, if desired. A suitable table is attached to and supported by the posts $a$ and $a'$ at suitable points below their upper ends and by the shorter posts, the table preferably comprising arms $c$ and $c'$, and a center piece $d$ having a central opening $d'$ therein, the arms preferably being connected at their extremities by a rim $e$, so that the table is more or less open in order to avoid excessive weight in construction, and as shown the rim part of the table is attached to the supporting posts. An annular gage $f$ stands upright on and is detachably secured to the table and preferably has a horizontal flange $f'$ extending inwardly, so that a hollow wheel rim may be placed upon the flange against the gage $f$, which will serve as an abutment for the rim to prevent the rim from yielding while the spokes are forced into the sockets thereof. In the opening $d'$ is a cylindrical socket head $g$ movable vertically, and in the upper portion thereof is a socket $g'$ adapted to receive one part of a two part hub with the smaller end of the hub lowermost in the socket. Means for controlling the movements of the socket head $g$ comprise a stop nut $h$ which is screwed onto the exterior of the upper end of the socket head and may be adjusted so as to stop the socket head when drawn down until the nut engages the center piece $d$ of the table. Other forms of stops, however, may be substituted for the nut $h$, if preferred. In the under portion of the socket head is a suitable number of relatively smaller sockets $i$ in the bottoms of which are secured guide rods $j$ extending through the sockets. A housing $k$ is secured against the under side of the center piece $d$ of the table and has guide openings $k'$ therein through which the guide rods extend, there being coiled springs $l$ on the guide rods seated in the lower portion of the housing and in the bottoms of the sockets $i$ to normally hold the socket head at a suitable height, the upper movement of the socket head being restricted adjustably by means of a screw-threaded rod $m$ on which is a stop nut $m'$ adapted to normally engage the under side of the housing $k$ through which the rod $m$ extends movably, the rod $m$ being secured at its upper end to the socket head $g$ and having its lower end connected to a link $n$ which is pivoted to a lever $o$, having one end pivoted to the post $b'$ and its other end extending through a slot $o'$ in the post $b$, so that foot-power may be applied to the lever to draw the socket head $g$ downwardly, should occasion require it.

A beam $p$ is secured to the upper ends of the posts $a$ and $a'$ and at its center is enlarged so as to provide a housing $p'$ in which a nut $q$ is suitably mounted so as to rotate without moving vertically, the nut being provided with a suitable number of operating levers or handles $q'$. A screw ram $r$ is mounted in the nut $q$ to be operated under control thereby and has a collar $r'$ near its lower end beyond which extends a head portion $r^2$ that is cylindrical, the remaining screw portion of the ram having a longitudinal groove $r^3$ therein to serve in preventing the screw from turning while the nut turns about the screw portion. For preventing the vertical movement of the nut, a pair of keys $s$ and $s'$ preferably are employed and fitted into the housing of the beam and extending into a suitable groove in the periphery of the nut $q$. A plate $t$ is secured against the under side of the housing and has a projection $t'$ that extends into the groove $r^3$, so that while the nut may cause the ram to descend the projection will remain in the groove and prevent rotation of the ram.

The ram head preferably comprises two annular plates $u$ and $v$ having sockets $u'$ and $v'$ in the opposing sides thereof, the plates being arranged in parallel order on the head part $r^2$ of the ram so as to be movable thereon, the plate $u$ being seated against the collar $r'$, and the plate $v$ being normally held against a head piece $w$ that is secured to the head part $r^2$, there being springs $x$ seated in the sockets of the plates $u$ and $v$ normally maintaining the relative positions of the two plates. The ram head, however, may be variously modified to suit requirements or fancy.

It should be understood that the gage $f$ may be removed, and other gages of different diameters may be placed upon the table to suit various sizes of wheels, and various other modifications of minor importance may be made within the scope of the invention.

In practical use the rim or felly of the wheel, which may be hollow and formed of sheet metal so as to be practically continuous, is placed upon the flange $f'$ with the tread portion against the gage $f$, the rim having sockets or openings to receive the tenons of the spokes. The hubs employed have two principal parts, one part of which is placed in the socket $g'$ of the socket head, then the tenons of the spokes which may be formed of sheet metal are entered in the sockets or openings in the rim with the other ends of the spokes placed upon the part of the hub against the spoke seat thereof. In some cases the treadle $o$ may be pressed downwardly so as to draw the socket head down somewhat until the spokes become tight against the hub seat. The other part of the hub should be placed in position and then the ram should be moved downwardly on the top thereof with the plate $v$ bearing upon the upper end of the hub part. The springs $x$ are relatively strong but may yield slightly so that the plate $v$ will bear evenly upon the hub part even though the latter may be slightly tilted out of parallel. The lever or levers $q'$ are to be manipulated so as to turn the nut $q$ so as to force the ram downwardly, thus pressing the upper part of the hub upon the spoke ends that bear on the lower part of the hub, thereby forcing the socket head $g$ downwardly and forcing the tenons of the spokes into the rim until fully seated. The pressure may be regulated so that a wheel may be given as much dish as may be desired or none, as may have been pre-arranged. The two parts of the hub are to be bolted together or riveted together, as may be preferred, and then the ram may be withdrawn, after which the wheel may be removed from the machine ready to receive its tire and boxing, but if desired the boxing may be pressed into the hub in the machine by means of the ram.

Having thus described the invention, what is claimed as new is—

1. A wheel-assembling machine including a support, a table secured to the support and provided with a circular gage on the top thereof and also a socket head mounted movably centrally of the gage, means for supporting the socket head yieldingly, and a ram mounted movably above the socket head to coöperate therewith.

2. A wheel-assembling machine including a support, a table secured to the support and provided with a circular gage on the top thereof, a ram mounted movably opposite to the center of the gage, a socket head movably mounted in the table centrally of the gage to coöperate with the ram and provided with a stop limiting the movement thereof away from the ram, and means for moving the socket head towards the ram.

3. A wheel-assembling machine including a support, a table secured to the support and having an opening therein, a circular gage on the table concentric to the opening, a ram mounted movably toward or from the table opposite to the opening, a socket head mounted movably in the opening of the table opposite to the ram and provided with a stop limiting the movement thereof toward the ram, and means for moving the socket head toward the ram.

4. A wheel-assembling machine including a pair of posts, a table secured to the posts and having a central opening therein, a socket head mounted movably in the opening and normally spring-pressed upwardly, a stop for limiting the upward travel of the socket head, a circular gage secured detachably on the table concentric to the socket head, a beam secured to the posts above the table and provided with a central housing, a screw-nut mounted rotatively in the housing and provided with an operating lever, and a screw-threaded ram mounted in the screw-nut opposite to the socket head.

5. A wheel-assembling machine including a support, a table mounted securely on the support and provided with a housing and also an opening above the housing, a socket head mounted movably in the opening, means in the housing for supporting the socket head yieldingly, an adjustable stop for limiting the downward travel of the socket head, a circular gage mounted on the table concentric to the socket head, and a ram mounted movably opposite to the socket head to coöperate therewith.

6. A wheel-assembling machine including a support, a table mounted securely on the support and having an opening therein, a socket head mounted movably in the opening, means for moving the socket head, a circular gage mounted on the table concentric to the socket head, a beam opposite to the table and connected fixedly therewith, a ram mounted movably in the beam, means for operating the ram forcibly opposite to the socket head, and means for adjustably limiting the movements of the socket head.

7. A wheel-assembling machine including a support, a table mounted securely on the support and having an opening therein, a socket head mounted movably in the opening, means for variably adjusting the amount of travel of the socket head, a circular gage mounted on the table concentric to the socket head, a beam opposite to the table and connected fixedly therewith, and a ram mounted movably in the beam opposite to the socket head.

8. A wheel-assembling machine including a support, a table mounted securely on the support and having an opening therein, a socket head mounted in the opening, a circular gage mounted on the table concentric to the socket head, a beam opposite to the table and connected fixedly therewith, a ram mounted in the beam opposite to the socket head and having a yielding head thereon to coöperate with the socket head and the gage, and means for operating the ram.

In testimony whereof, I affix my signature in presence of two witnesses, on the 22nd day of March, 1907.

JOHN R. WELCH.

Witnesses:
   JOSEPH G. BRANNUM,
   SAMUEL G. PHILLIPS.